Aug. 25, 1942.  R. ELMS  2,294,165

DISTANCE INDICATOR

Filed May 21, 1940  2 Sheets-Sheet 1

Inventor
Robert Elms
By [signature]
Atty.

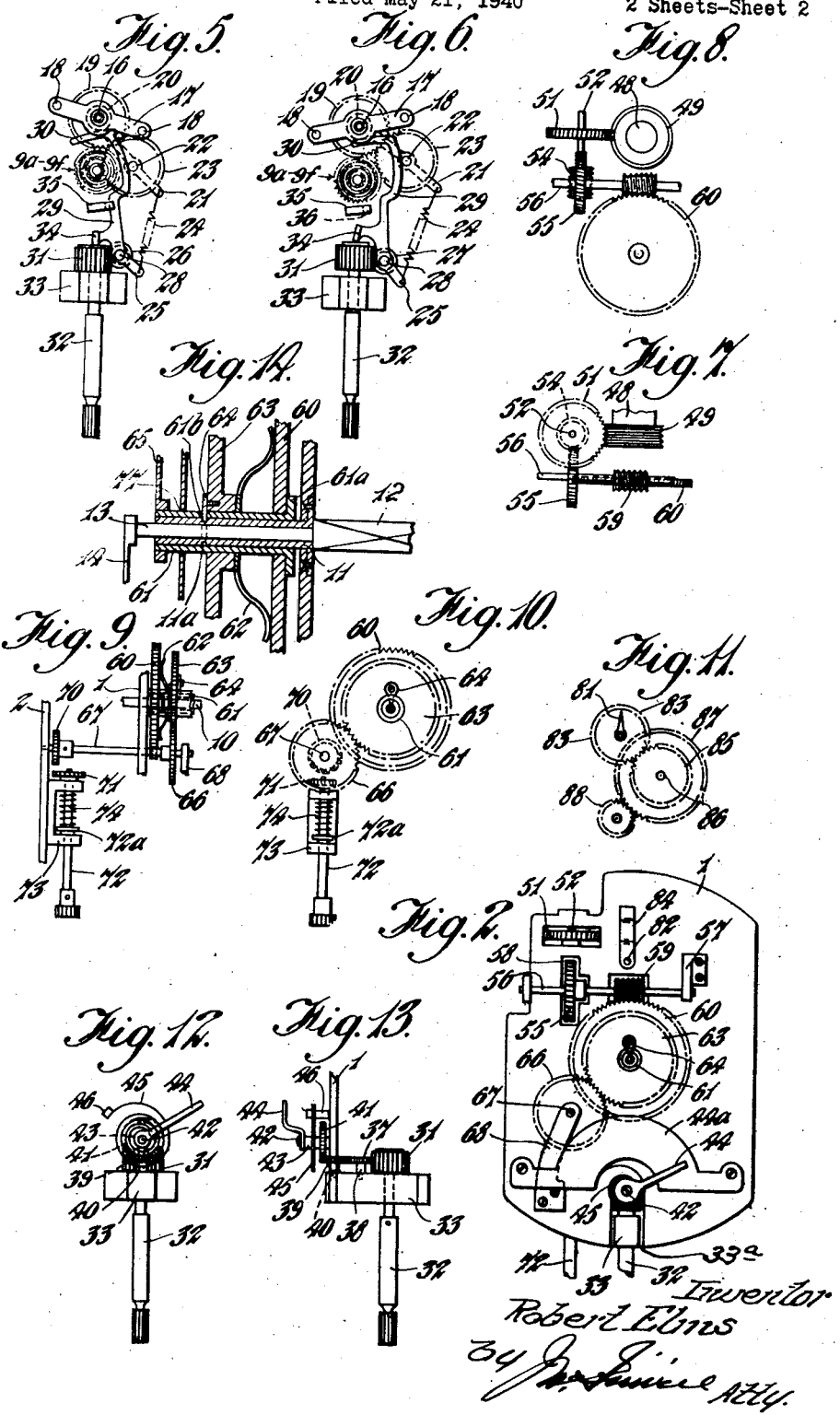

Patented Aug. 25, 1942

2,294,165

UNITED STATES PATENT OFFICE 2,294,165

DISTANCE INDICATOR

Robert Elms, London, England

Application May 21, 1940, Serial No. 336,483
In Great Britain May 31, 1939

3 Claims. (Cl. 235—103.5)

My invention relates to mileage or like indicators for vehicles, and to the kind of such indicators which indicate the mileage or distance which should have been travelled by the vehicle if a constant predetermined speed were maintained.

The object of my invention is to provide an improved mileage or distance indicator of the kind referred to above.

My invention consists in the combination of parts set forth in the claims appended hereto.

Referring now to the accompanying drawings,

Figure 2 shows a front elevation of the indicator mechanism removed from its casing and with the dial and pointers also removed.

Figure 3 shows a front elevation of the dial of the indicator illustrated in Figure 1, while Figure 4 shows a similar view of a modified form of dial.

Figures 5 and 6 show detail views of the gear-changing mechanism in the engaged and disengaged positions respectively.

Figures 7 and 8 show a detail plan and elevation respectively of the mechanism for driving the actual mileage pointer.

Figures 9 and 10 show detail views at right angles to each other of the mechanism for zero-setting of the actual mileage pointer.

Figure 11 shows a detail view of the mechanism for driving the pointer which indicates complete revolutions of the constant speed mileage pointer.

Figures 12 and 13 show views at right angles to each other of the mechanism for setting the constant speed pointer corresponding to the gear ratio.

Figure 14 shows a section of the bearing for the constant speed mileage spindle in the front plate of the mechanism frame.

Figure 1:
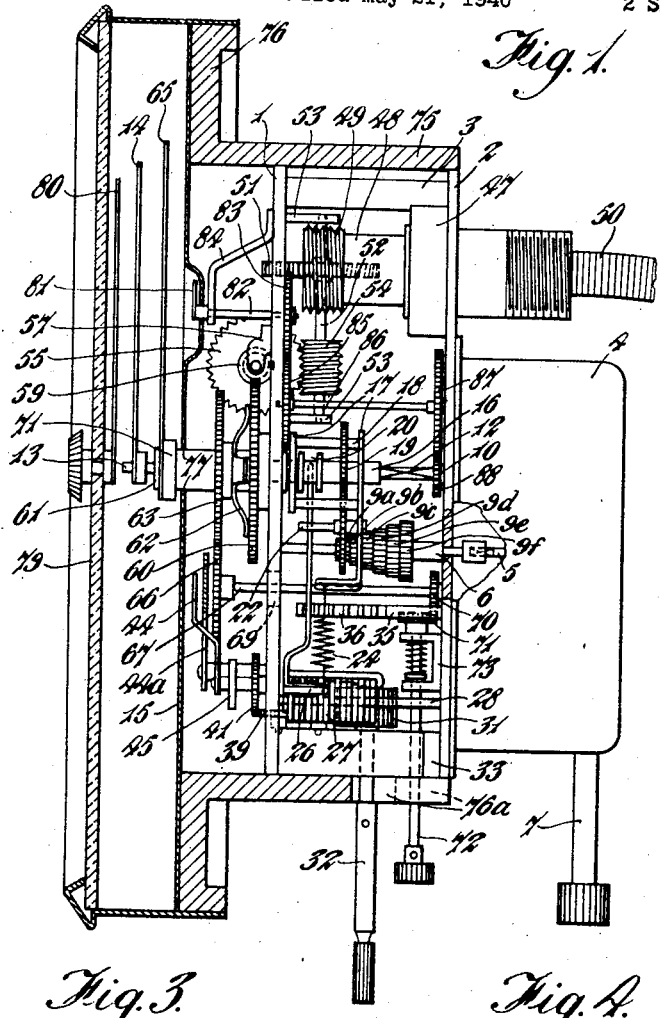
Figure 1 shows a longitudinal cross-section of an indicator constructed according to my invention.

In carrying my invention into effect, according to one form, and as applied by way of example to an indicator for a motor road vehicle, a frame for the mechanism of the indicator is constructed of two plates, viz., a front plate 1, Figure 1, and a rear plate 2, which are spaced apart by suitable distance pieces 3 and rigidly connected together. To the rear of the rear plate 2 is attached a clock enclosed in a suitable casing 4, the dial of the clock being dispensed with. The minute hand spindle 5 of the clock has an extension 6 which is driven by it. The extension 6 passes through both the rear plate 2 and the front plate 1 of the mechanism frame and is rotatably mounted in these plates. The clock is provided with a spindle 7 having a knurled head for moving the minute hand spindle 5 for setting purposes and also for winding the clock in known manner.

The extension 6 of the minute hand spindle 5, in the present example, carries a set of six spur gear pinions 9a to 9f having eight, ten, twelve, fourteen, sixteen and eighteen teeth each respectively. Above the minute hand spindle extension 6 there is rotatably mounted in the front and rear plates 1 and 2 of the mechanism frame a constant speed mileage pointer spindle 10, and this spindle extends throught a stationary flanged sleeve 11, Figure 14, rigidly mounted in the front plate 1 and projecting outwards for a suitable distance. The flanged sleeve 11 forms a bearing for the constant speed mileage pointer spindle 10. The part 12 of the spindle 10 extending between the bearings in the front and rear plates 1 and 2 of the mechanism frame is of square section, while the remainder of this spindle is of circular section. On the front end of the part 13 of the spindle 10 is attached a pointer 14 which indicates the constant speed mileage on a dial 15 to be hereinafter described.

On the squared part 12 of the spindle 10 a sleeve 16 is mounted, the sleeve having a square bore so that the sleeve is capable of sliding on the spindle 10 but is incapable of rotation thereon. Two double-armed rockers 17, Figures 1, 5 and 6, are rotatably mounted on the sleeve 16 and these rockers are spaced apart by distance pieces 18 so as to form a rockable frame. Between the rockers 17 a spur wheel 19 having forty teeth is rigidly mounted on the sleeve 16 and a circumferential groove 20 is also formed on the sleeve. The rockable frame is provided with an arm 21 which extends in a downwardly inclined direction and this arm carries a pin 22 on which an idler wheel 23 is rotatably mounted. The idler wheel 23 is permanently in gear with the wheel 19 above described, and may be brought into mesh with any of the six pinions 9a to 9f mounted on the extension 6 of the minute hand spindle 5.

The lower end of the arm 21 of the rockable frame is connected to one end of a spiral tension spring 24 of which the other end is connected to an arm 25 of a three-armed lever 26 fixed at one end of a rack 27 of circular cross section. The rack 27 is slidably and rotatably mounted on a spindle 28 extending between the front and rear plates 1 and 2 of the mechanism frame.

A second arm 29 of the three-armed lever 26 having a bent upper end 30 projects upwards and when the lever is operated an intermediate point of this arm contacts with the pin 22 of the idler 23 and swings the rockable frame, while its upper bent end 30 always engages with the groove 20 on the sleeve 16 which carries the rockable frame.

With the rack 27 a wide pinion 31 engages. The pinion 31 is rigidly attached to the upper end of a vertical spindle 32 which is slidably and rotatably mounted on a bracket 33 fixed at the bottom of the rear plate 2 of the mechanism frame. The bracket 33 projects into a slot 33a in the front plate 1. The vertical spindle 32 is knurled at its lower end and is used to select the gear ratio between the minute hand spindle 5 and the spindle 10. The top of the wide pinion 31, when the gear-selecting spindle 32 is pushed upwards, Figure 6, swings the third arm 34 of the three-armed lever 26 before mentioned. A gate bracket 35 having six notches 36 is fixed to the front side of the rear plate 2 of the mechanism frame and the second arm 29 of the three-armed lever 26 engages with one or other of the six notches in the gate bracket except when the gear ratio of the minute hand extension 6 and of the constant speed mileage pointer spindle 10 is being changed as hereinafter described.

An idler wheel 37, Figures 1, 12 and 13, is rotatably mounted on a pin 38 on the bracket 33 carrying the gear-selecting spindle 32 and engages with the wide pinion 31, on the one hand, and with a toothed wheel 39, on the other hand, which partly projects through the front plate 1 of the mechanism frame and which is rotatably mounted on a pin 40 on the bracket 33. The toothed wheel 39 engages with a toothed wheel 41 rotatably mounted on a spindle 42 which projects at right angles from the front plate 1 of the mechanism frame, the axis of rotation of the second wheel being at right angles to that of the first wheel. The boss 43 of the wheel 41 carries a speed pointer 44 for indicating the miles per hour corresponding to the different gear ratios. The boss 43 of the wheel 41 is connected to the inner end of a flat helical spring 45 of which the outer end is anchored to a pin 46 fixed to the front plate 1 of the mechanism frame. The spring 45 takes up any backlash in the gearing operating the speed pointer 44. The speed pointer 44 is preferably painted red and is provided with a backing plate 44a which is painted white.

At the top of the rear plate 2, Figure 1, of the mechanism frame and on the front side of this plate a bearing 47, Figures 7 and 8, for a shaft 48 is provided. The shaft 48 carries a worm 49 which is disposed between the front and rear plates 1 and 2 of the mechanism frame, and has a driving connection for a flexible transmission shaft 50 which is driven either from the vehicle transmission shaft or from a road wheel of the vehicle. The worm 49 meshes with a worm wheel 51 rigidly fixed to a vertically disposed shaft 52, and this shaft is rotatably mounted in bearings 53 disposed on the rear side of the front plate 1 of the mechanism frame. The vertical shaft 52 has also a worm 54 fixed thereon which meshes with a worm wheel 55 carried on a horizontal shaft 56 which is rotatably mounted in bearings 57 disposed on the front face of the front plate 1, the worm wheel 55 projecting through a slot 58, Figure 2, in the front plate in order to gear with the worm 54. On the horizontal shaft 56 is fixed a worm 59 which engages with a worm wheel 60 loosely mounted on a flanged sleeve 61, Figure 14. The sleeve 61 in turn is rotatably mounted on the stationary sleeve 11 in the front plate 1 through which the spindle 10 passes as before described. One face of the worm wheel 60 is in frictional contact with the flange 61a of the sleeve 61, while one face of a spider-shaped spring 62 contacts with the other face of the worm wheel 60. The spring 62 is loosely mounted on the rotatably mounted flanged sleeve 61 and its other face bears on the adjacent face of a spur wheel 63 attached to the sleeve 61 so as to compress the spring and form a frictional drive between the worm wheel 60 and the flanged sleeve 61. A retaining plate 64 is secured to the front of the spur wheel 63 and passes through a slot 61b in the rotatably mounted flanged sleeve 61 and runs in a groove 11a formed in the stationary sleeve 11 thus preventing axial movement thereon of the flanged sleeve 61 and forming at the same time a driving connection between the spur wheel 63 and the sleeve 61. The actual mileage pointer 65 is attached to the front end of the sleeve 61.

The spur wheel 63, Figures 2, 10 and 11, on the flanged sleeve 61 engages with a spur wheel 66 rigidly mounted on a horizontal spindle 67, the front end of which is rotatably mounted on a bracket 68 fixed to the front face of the front plate 1 of the mechanism frame, while the rear end of this spindle is rotatably mounted in the rear plate 2 of the mechanism frame. A clearance hole 69 is formed in the front plate 1 through which hole the spindle 67 passes. Adjacent to the rear plate 2 of the mechanism frame the horizontal spindle 67 is provided with a toothed wheel 70 which is adapted to engage with a second toothed wheel 71 rigidly fixed to the upper end of a spring-mounted vertical setting spindle 72 which is slidably and rotatably mounted in bearings on a bracket 73 attached to the rear plate 2. The lower end of the setting spindle 72 is knurled and a spring 74 bears against a collar 72a and holds the spindle in such a position that the toothed wheel 71 is normally out of mesh with its co-acting wheel 70. By pushing the setting spindle 72 upwards so that the two toothed wheels 70 and 71 mesh and then rotating the spindle 72 the actual mileage pointer 65 is rotated through the toothed wheels 70 and 71, spindle 67, spur wheels 66 and 63, and sleeve 61, and may be set in any desired position, as the spider-shaped spring 62 above described located between the spur wheel 63 and the worm wheel 60 on the flanged sleeve 61 permits the spur wheel 63 together with the above mentioned pointer 65 to rotate relatively to the worm wheel 60.

The mechanism frame as above described is housed in a circular casing 75, Figure 1, having a front flange 76. Slots 76a are provided in the casing 75 for accommodating the gear-selecting spindle 32 and also the spindle 72 for setting the actual mileage pointer 65.

The dial 15 has a circular scale 15a graduated in miles from 1 to 100 and is arranged over the front flange 76 of the mechanism casing 75, the dial being provided with a central hole 77 through which project the sleeve 61 carrying the actual mileage pointer 65 and the end of the constant speed mileage pointer spindle 10 carrying the pointer 14. The pointers 14 and 65 are adapted to travel one above the other over the scale 15a on the dial 15. The outer end of the pointer 65 which indicates the actual mileage is colored black, while the end of the pointer 14 which indicates the constant speed mileage is colored red. A set of radially disposed apertures 78 are arranged in the lower portion of the dial 15 and these apertures are numbered 20, 25, 30, 35, 40 and 45. Through these apertures the end of the pointer 44 which indicates the constant speed in miles per hour corresponding to the operative speed ratio may be seen. The casing 75 is provided with a glass cover plate 79 which carries a movable pointer 80 for setting as required to indicate the number of miles in the journey to be undertaken by the vehicle.

The operation of the indicator is as follows:

The minute hand spindle 5 operates the constant speed mileage pointer spindle 10 through the extension 6 and a variable speed gear which comprises the toothed wheel 19 on the sleeve 16, the idler 23 on the arm 21 of the rockable frame and the six pinions 9a to 9f on the extension 6 as above described. The lowest constant speed for which the present instrument is designed is 20 miles per hour. For this speed the idler pinion 23 carried by the arm 21 of the rocker frame meshes with the pinion 9a having eight teeth arranged on the minute hand spindle extension 6, and also meshes with the 40-tooth wheel 19 carried on the sleeve 16 on the spindle 10. In this position the circular rack 27 is close up against the front plate 1 of the mechanism frame, the second arm 29 of the three-armed lever 26 is clear of the pin 22 of the idler 23 carried by the arm 21 of the rockable frame, the upper bent end 30 of the arm 29 is in engagement with the groove 20 of the sleeve 16 on the constant speed pointer spindle 10 and the arm 29 is also in engagement with the front notch of the notches 36 on the gate bracket 35, thereby locking the gear-changing mechanism in position. The third arm 34 of the three-armed lever 26 is in contact with the upper face of the wide pinion 31 and the speed pointer 44 indicates 20 miles per hour.

Transmission from the clock therefore takes place through the minute hand spindle 5, extension 6, pinion 9a, idler 23, and wheel 19 and sleeve 16 to the constant speed mileage pointer spindle 10, and the pointer 14 thereon will move over the graduated scale 15a of the dial 15 when the clock is set in motion.

To set the instrument for a constant speed of 25 miles per hour, it is necessary to push the gear selecting spindle 32 inwards. The upper face of the wide pinion 31 thereby actuates the third arm 34 of the three-armed lever 26 and swings the lever and the circular rack 27 clockwise. The second arm 29 of the three-armed lever 26 is thereby lifted out of the first notch of the notches 36 in the gate bracket 35 and at the same time this arm contacts with the pin 22 of the idler wheel 23 on the arm 21 of the rockable frame and swings the idler 23 out of engagement with the pinion 9a on the minute hand spindle extension 6, the movement of the three-armed lever 26 taking place against the action of the spring 24 connecting the arm 25 of this lever with the end of the arm 21 on the rockable frame.

After the gear selecting spindle 32 has been pushed inwards to effect the above movements, it is retained in this position and then turned clockwise. This rotational movement of the wide pinion 31 causes the speed pointer 44 to move to the aperture 78 which indicates 25 miles per hour from the aperture which indicates 20 miles per hour on the dial 15, the movement of the pinion 31 being transmitted to the pointer 44 through the idler 37 and wheels 39 and 40. During the rotational movement of the wide pinion 31 the circular rack 27 is moved on its spindle 28 towards the rear plate 2 of the mechanism frame for a corresponding distance and the rack carries the three-armed lever 26 along with it. The second arm 29 of the three-armed lever 26 is moved opposite to the next notch 36 in the gate bracket 35 and at the same time since its bent upper end 30 engages with the groove 20 on the sleeve 16 on which the rockable frame is carried, this sleeve and the frame are also moved towards the rear plate 2 of the mechanism frame for the same distance as the circular rack 27. The wheel 19 is also carried along with the sleeve 16. When the speed pointer 44 has moved opposite the aperture 78 corresponding to 25 miles per hour, the gear-selecting spindle 32 is released so that the three-armed lever 26 is returned by its spring 24 to its original position and this spring also swings the rockable frame so that the idler wheel 23 now engages with the pinion 9b on the minute hand spindle extension 6. The return of the three-armed lever 26 causes the arm 29 thereof to move into the second notch 36 in the gate bracket 35 so that the variable speed mechanism is locked in the second speed position. Changes for other speeds are effected in a similar manner to that above described.

The manner in which the instrument is used is as follows:

As stated above the dial 15 is provided with a circular scale 15a which shows the mileage from 1 to 100 miles. The minute hand spindle 5 of the clock mechanism ungeared makes one revolution in one hour and by providing this spindle with six pinions 9a to 9f having eight, ten, twelve, fourteen, sixteen and eighteen teeth respectively, and a toothed wheel 19 of 40 teeth on the constant speed mileage pointer spindle 10, the pointer 14 on this spindle will travel over 20, 25, 30, 35, 40 or 45 divisions in one hour on the scale 15a according to the gear ratio selected.

If, for example, it is desired to make a journey of 90 miles at an average speed of 30 miles per hour, the pointer 80 on the cover plate 79 of the instrument is set at 90 miles on the circular scale 15a on the dial 15 and the gear-selecting spindle 32 is operated in the manner above described until the pointer 44 which indicates the speed is set at 30 miles per hour. The spindle 72 for adjusting the actual mileage pointer 65 is operated so that this pointer is set to zero and the setting spindle 7 of the clock is also operated to set the constant speed mileage pointer 14 also at zero. When the vehicle starts on its journey the clock is also started and both pointers 14 and 65 travel over the graduated scale 15a in the same direction. The driver of the vehicle can tell at a glance the relative position of the pointers 14 and 65 so that if the pointer 65 falls behind the pointer 14 the speed of the vehicle will have to be accelerated if the average speed of 30 miles per hour is to be maintained, while if the pointer 14 falls behind the pointer 65 the vehicle will have to be slowed down to maintain the average speed. Similarly for other speeds and other lengths of journeys.

Instead of having the pointers 14 and 65 travelling over the same scale on the dial they may be arranged to travel over different scales on the same dial, or separate instruments may be arranged for indicating the actual and constant speed mileages. Again the constant speed mileage indicator when formed separately may be read in conjunction with the trip mileage of an ordinary speedometer.

Further, means may be provided for indicating the number of complete revolutions of the dial scale made by each of the pointers 14 and 65 in the case of long journeys. For example, the number of complete revolutions made by the pointer 14 on the dial 15 during a run of more than 100 miles may be indicated by a pointer 81, Figures 1, 3 and 11, carried by a spindle 82 on which a gear wheel 83 is also fixed. The spindle 82 is rotatably mounted in a bracket 84 attached to the front of the front plate 1 of the mechanism frame and is also rotatably mounted in the plate 1. The gear wheel 83 meshes with a gear wheel 85 fixed to a spindle 86 which also carries a second gear wheel 87 rigidly fixed thereon. The wheel 87 meshes with a pinion 88 fixed to the spindle 10. The ratio of the gearing connecting the spindles 82 and 10 is such that for one complete revolution of the spindle 10 the pointer 81 moves through one division.

Figures 3, 4:
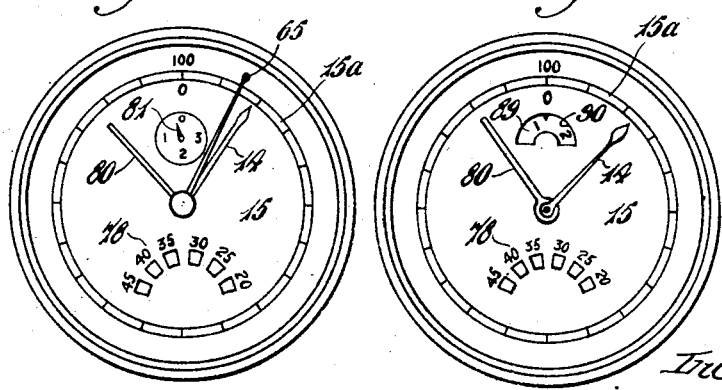

Again, instead of using the pointer 81 as above described I may provide a disc 89 at the rear of the dial, showing the figures through a radial aperture 90 in the dial, Figure 4, which indicates the number of complete revolutions made by the pointer 14 and I may provide a similar arrangement for the actual mileage.

Further, gear ratios other than those above described may be used and the readings instead of being in miles may be in kilometres or other units.

Again, the variable gear may be coupled to the clock mechanism at a point of the gear train other than the minute hand spindle, or the minute hand spindle may be converted to rotate at other than one revolution per hour.

In the case of applying my invention to aircraft, the constant speed pointer 14 would represent various speeds of which the particular machine to be fitted with the instrument is capable and may be read in conjunction with a scale map in strip form of the journey and periodically checked with definite land or maritime objectives. Any change of speed could instantly be corrected by means of change of gear ratio and by re-adjustment of the pointer. For long range machines the dial may be graduated so that the scale shows 1000 divisions instead of 100.

My invention may be applied to vehicles other than motor road vehicles and aircraft.

By means of my invention an improved form of indicator is provided by means of which a predetermined average speed may be maintained in a simple and convenient manner.

Modifications may be made within the scope of the claims appended hereto.

What I claim is:

1. In a distance indicator, a spindle, a plurality of gear wheels of different diameters fixed on said spindle, a second spindle, a gear wheel in driving relation with said second spindle and slidable thereon, intermediate gearing permanently in mesh with the gear wheel on said second spindle and normally in engagement with a gear wheel on said first spindle, a slidable and rotatable gear changing spindle, a rockable and slidable lever co-acting with said gear changing spindle, a spindle for said lever, a gate member co-acting with said lever, a spring co-acting to normally hold said intermediate gearing in mesh with a gear wheel on said first spindle and to normally hold said lever in engagement with said gate member, said gear-changing spindle on being slidably displaced from its normal position disengaging said lever from said gate member and disengaging said intermediate gearing from a gear wheel on said first spindle, said gear-changing member on being rotated in its slidably displaced position positioning said intermediate gearing for engagement with another gear wheel on said first spindle, said spring on release of said gear-changing spindle acting to engage said intermediate gearing with the selected gear wheel on said first spindle and engage said lever with said gate member.

2. A distance indicator including a spindle, a plurality of gear wheels of different diameters fixed on said spindle, a second spindle, a gear wheel in driving relation with the second spindle and slidable thereon, an idler wheel in permanent mesh with the gear wheel on the second spindle, said idler wheel being normally in engagement with a gear wheel on the first mentioned spindle, a gear changing member mounted for sliding and rotary movements, means coacting with said gear changing member to move said member to disengage said idler wheel from a particular gear wheel on the first mentioned spindle, said means slidably displacing said gear changing member to position said idler for engagement with a selected gear wheel on the first mentioned spindle, and means including a spring coacting with the gear changing member to effect such engagement.

3. In a distance indicator the combination with clockwork mechanism, of a stationary frame, a spindle rotatably mounted in said frame and driven by the minute spindles of said clockwork mechanism, a plurality of gear wheels of different diameters fixed on said first mentioned spindle, a second spindle mounted rotatably in said stationary frame, means coacting with said second spindle for indicating distances covered at constant speed, a sleeve slidable on said second spindle and non-rotatable relative thereto, a gear wheel fixed on said sleeve, a frame rockable on said sleeve, a spring coacting with said rockable frame, an idler wheel carried by said rockable frame, said idler wheel being permanently in mesh with said gear wheel on said sleeve and held normally in mesh by said spring with a gear wheel on said first mentioned spindle, a gear changing member slidably and rotatably mounted in said stationary frame and independent of said first and second spindles, and means for moving said gear changing member for rocking said rockable frame against the action of said spring to disengage said idler wheel from a particular gear wheel on said first mentioned spindle, and for selectively positioning said sleeve axially on said spindle, whereby on release of said member engagement of the idler wheel with a selected gear wheel is effected by said spring.

ROBERT ELMS.